United States Patent
Ellis et al.

(10) Patent No.: US 12,066,991 B2
(45) Date of Patent: *Aug. 20, 2024

(54) SYSTEM AND METHODS FOR LIVE DATA MIGRATION

(71) Applicant: Palantir Technologies Inc., Denver, CO (US)

(72) Inventors: Joseph Ellis, Palo Alto, CA (US); Mark Elliot, New York, NY (US); Robert Fink, San Francisco, CA (US); Sandor Van Wassenhove, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,548

(22) Filed: Apr. 10, 2023

(65) Prior Publication Data

US 2023/0252007 A1 Aug. 10, 2023

Related U.S. Application Data

(63) Continuation of application No. 17/583,751, filed on Jan. 25, 2022, now Pat. No. 11,625,369, which is a (Continued)

(51) Int. Cl.
*G06F 16/00* (2019.01)
*G06F 16/21* (2019.01)
(Continued)

(52) U.S. Cl.
CPC .......... *G06F 16/214* (2019.01); *G06F 16/213* (2019.01); *G06F 16/2379* (2019.01); *G06F 16/245* (2019.01)

(58) Field of Classification Search
CPC .. G06F 16/214; G06F 16/213; G06F 16/2379; G06F 16/245
See application file for complete search history.

(56) References Cited

U.S. PATENT DOCUMENTS

| | | | |
|---|---|---|---|
| 5,568,390 | A | 10/1996 | Hirota et al. |
| 5,857,329 | A | 1/1999 | Bigham |

(Continued)

FOREIGN PATENT DOCUMENTS

| | | | |
|---|---|---|---|
| EP | 0652513 | A1 | 5/1995 |
| EP | 1926074 | A1 | 5/2008 |

(Continued)

OTHER PUBLICATIONS

Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notificati-ons-for-suspicious-activity/.
(Continued)

*Primary Examiner* — Noosha Arjomandi
(74) *Attorney, Agent, or Firm* — Sheppard Mullin Richter & Hampton LLP

(57) ABSTRACT

Systems and methods are provided for data migration. The system may comprise one or more processors and a memory storing instructions that, when executed by the one or more processors, cause the system to migrate at least one first table of a first database schema to at least one second table of a second database schema, determine a query for modifying the first table during the migration, modify the second table based at least in part on the query, and update a mutation table to describe the modification, wherein the mutation table at least describes the modification.

20 Claims, 7 Drawing Sheets

Related U.S. Application Data continuation of application No. 16/562,309, filed on Sep. 5, 2019, now Pat. No. 11,232,082, which is a continuation of application No. 15/720,766, filed on Sep. 29, 2017, now Pat. No. 10,452,626, which is a continuation of application No. 15/474,713, filed on Mar. 30, 2017, now Pat. No. 9,805,071.

(60) Provisional application No. 62/420,353, filed on Nov. 10, 2016.

(51) Int. Cl.
    *G06F 16/23* (2019.01)
    *G06F 16/245* (2019.01)

(56) References Cited

U.S. PATENT DOCUMENTS

| | | | |
|---|---|---|---|
| 5,902,349 A | 5/1999 | Endo et al. | |
| 6,496,774 B1 | 12/2002 | Davies | |
| 6,608,559 B1 | 8/2003 | Lemelson et al. | |
| 6,836,773 B2* | 12/2004 | Tamayo | G06F 16/958 |
| 7,603,229 B2 | 10/2009 | Goldberg et al. | |
| 7,689,455 B2 | 3/2010 | Fligler et al. | |
| 7,818,291 B2 | 10/2010 | Ferguson et al. | |
| 7,941,321 B2 | 5/2011 | Greenstein et al. | |
| 8,042,110 B1 | 10/2011 | Kawahara et al. | |
| 8,046,283 B2 | 10/2011 | Burns et al. | |
| 8,108,138 B2 | 1/2012 | Bruce et al. | |
| 8,352,174 B2 | 1/2013 | Milstein et al. | |
| 8,417,409 B2 | 4/2013 | Bast et al. | |
| 8,763,078 B1 | 6/2014 | Castellucci et al. | |
| 8,786,605 B1 | 7/2014 | Curtis et al. | |
| 8,880,477 B2* | 11/2014 | Barker | G06F 9/455 707/649 |
| 9,092,482 B2 | 7/2015 | Harris et al. | |
| 9,195,696 B2* | 11/2015 | Smith | G06F 16/2228 |
| 9,256,761 B1* | 2/2016 | Sahu | G06F 21/6218 |
| 9,280,532 B2 | 3/2016 | Cicerone | |
| 9,582,524 B1* | 2/2017 | Murali | G06F 16/214 |
| 9,633,406 B2* | 4/2017 | Bala | G06F 9/5077 |
| 9,720,991 B2* | 8/2017 | Kritchko | G06F 16/27 |
| 9,805,071 B1 | 10/2017 | Ellis et al. | |
| 9,996,562 B2* | 6/2018 | Higginson | G06F 16/214 |
| 11,232,082 B2 | 1/2022 | Ellis et al. | |
| 11,625,369 B2* | 4/2023 | Ellis | G06F 16/214 707/690 |
| 11,657,037 B2* | 5/2023 | Krishnaswamy | G06F 16/275 707/703 |
| 2004/0153418 A1 | 8/2004 | Hanweck | |
| 2006/0031813 A1* | 2/2006 | Bishop | G06F 9/5061 717/102 |
| 2006/0229931 A1* | 10/2006 | Fligler | G06Q 30/02 705/7.38 |
| 2006/0241856 A1 | 10/2006 | Cobleigh et al. | |
| 2007/0050589 A1* | 3/2007 | Tanaka | G06F 3/061 707/E17.005 |
| 2007/0088596 A1 | 4/2007 | Berkelhamer et al. | |
| 2007/0198571 A1 | 8/2007 | Ferguson et al. | |
| 2007/0220604 A1 | 9/2007 | Long | |
| 2008/0301559 A1 | 12/2008 | Martinsen et al. | |
| 2008/0313281 A1 | 12/2008 | Scheidl et al. | |
| 2009/0037912 A1 | 2/2009 | Stoitsev et al. | |
| 2009/0287718 A1* | 11/2009 | Motoyama | G06Q 10/109 |
| 2009/0319418 A1 | 12/2009 | Herz | |
| 2010/0162371 A1 | 6/2010 | Geil | |
| 2010/0205662 A1 | 8/2010 | Ibrahim et al. | |
| 2011/0041084 A1 | 2/2011 | Karam | |
| 2011/0153592 A1 | 6/2011 | DeMarcken | |
| 2011/0185401 A1 | 7/2011 | Bak et al. | |
| 2012/0041933 A1 | 2/2012 | Driesen | |
| 2012/0101952 A1 | 4/2012 | Raleigh et al. | |
| 2012/0290506 A1 | 11/2012 | Muramatsu et al. | |
| 2013/0036346 A1 | 2/2013 | Cicerone | |
| 2013/0085998 A1 | 4/2013 | Barker et al. | |
| 2013/0231862 A1 | 9/2013 | Delling et al. | |
| 2013/0286601 A1 | 10/2013 | Shin et al. | |
| 2013/0311423 A1* | 11/2013 | Price | G06F 16/214 707/609 |
| 2014/0059056 A1* | 2/2014 | Chaney | G06F 16/27 707/736 |
| 2014/0081685 A1 | 3/2014 | Thacker et al. | |
| 2014/0149591 A1* | 5/2014 | Bhattacharya | G06F 9/5072 709/226 |
| 2014/0181833 A1 | 6/2014 | Bird et al. | |
| 2014/0310493 A1* | 10/2014 | Pace | G06F 3/0604 711/165 |
| 2015/0074053 A1* | 3/2015 | Sarferaz | G06F 16/283 707/634 |
| 2015/0112923 A1 | 4/2015 | Driesen et al. | |
| 2015/0120176 A1 | 4/2015 | Curtis et al. | |
| 2015/0178014 A1* | 6/2015 | Nelson | G06F 3/067 711/114 |
| 2015/0261817 A1 | 9/2015 | Harris et al. | |
| 2015/0317361 A1* | 11/2015 | Battaglia | G06F 16/2455 707/718 |
| 2016/0063050 A1* | 3/2016 | Schoen | G06F 16/214 707/690 |
| 2016/0117375 A1 | 4/2016 | Antonopoulos | |
| 2016/0147730 A1 | 5/2016 | Cicerone | |
| 2017/0093913 A1* | 3/2017 | Summers | H04L 63/105 |
| 2018/0225288 A1* | 8/2018 | Shivam | H04L 67/06 |

FOREIGN PATENT DOCUMENTS

| | | |
|---|---|---|
| EP | 2555126 A2 | 2/2013 |
| EP | 2876587 A1 | 5/2015 |
| WO | 2012025915 A1 | 3/2012 |

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, (Oct. 10, 1994) pp. 341-354.

Chen et al., "A Novel Emergency Vehicle Dispatching System," 2013 IEEE 77th Vehicular Technology Conference, IEEE, Jun. 2, 2013, 5 pages.

Eklund et al., "A Dynamic Multi-source Dijkstra's Algorithm for Vehicle Routing," Intelligent Information Systems, 1996, pp. 329-333.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

Notice of Allowance for U.S. Appl. No. 13/196,788 dated Dec. 18, 2015.

Notice of Allowance for U.S. Appl. No. 13/826,228 dated Mar. 27, 2015.

Notice of Allowance for U.S. Appl. No. 14/302,279 dated Apr. 5, 2016.

Notice of Allowance for U.S. Appl. No. 15/474,713 dated Jun. 29, 2017.

Official Communication for Canadian Patent Application No. 2846414 dated Apr. 13, 2016.

Official Communication for European Patent Application No. 14162372.8 dated Apr. 30, 2015.

Official Communication for German Patent Application No. 10 2013 221 057.4 dated Mar. 23, 2015.

(56) References Cited

OTHER PUBLICATIONS

Official Communication for German Patent Application No. 10 2013 221 052.3 dated Mar. 24, 2015.
Official Communication for Netherlands Patent Application No. 2012436 dated Nov. 6, 2015.
Official Communication for New Zealand Patent Application No. 623323 dated Apr. 17, 2014.
Official Communication for New Zealand Patent Application No. 623323 dated Jun. 6, 2014.
Official Communication for U.S. Appl. No. 13/196,788 dated Nov. 25, 2015.
Official Communication for U.S. Appl. No. 13/196,788 dated Oct. 23, 2015.
Official Communication for U.S. Appl. No. 13/657,656 dated May 6, 2015.
Official Communication for U.S. Appl. No. 14/196,814 dated May 5, 2015.
Official Communication for U.S. Appl. No. 14/302,279 dated Sep. 24, 2015.
Official Communication for U.S. Appl. No. 14/726,211 dated Apr. 5, 2016.
Reedy, Sarah, "Policy and Charging Rules Function (PCRF)," Sep. 13, 2010, http://www.lightreading.com/document.asp?doc_id=680015 printed Dec. 10, 2013 in 4 pages.
Stamos et al., "Remote Evaluation," Journal ACM Transactions on Programming Languages and Systems (TOPLAS) vol. 12, Issue 4, Oct. 1990, pp. 537-564.
Vose et al., "Help File for ModelRisk Version 5," 2007, Vose Software, pp. 349-353. [Uploaded in 2 Parts].
Wagner et al., "Dynamic Shortest Paths Containers," Electronic Notes in Theoretical Computer Science, vol. 92, No. 1, 2003, pp. 1-19.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.
Extended European Search Report for EP Appln. No. 20160699.3 dated Apr. 7, 2020, 10 pages.
Extended European Search Report dated Jan. 25, 2018, issued in related European Application No. 17200863.3 (10 pages).
Examination Report dated Nov. 30, 2021, issued in related European Application No. 20160699.3 (7 pages).
Notice of Allowance mailed Jun. 12, 2019, issued in related U.S. Appl. No. 15/720,766 (19 pages).
Notice of Allowance mailed Sep. 16, 2021, issued in related U.S. Appl. No. 16/562,309 (11 pages).
Notice of Allowance mailed Dec. 14, 2022, issued in related U.S. Appl. No. 17/583,751 (16 pages).
Examination Report dated Mar. 1, 2023, issued in related European Application No. 20160699.3 (5 pages).

\* cited by examiner

Database Table Schema 1

| First Name | Last Name | Street | City | State |
|---|---|---|---|---|
| John | Happy | 123 Main st. | New York | NY |
| Kate | Doe | 234 2nd st. | Los Angeles | CA |
| ... | ... | ... | ... | ... |

FIGURE 2A

Database Table Schema 2

| First Name | Last Name | Address |
|---|---|---|
| John | Happy | 123 Main st., New York, NY |
| Kate | Doe | 234 2nd st., Los Angeles, CA |
| ... | ... | ... |

FIGURE 2B

SYSTEM AND METHODS FOR LIVE DATA MIGRATION

CROSS REFERENCE TO RELATED APPLICATIONS

This application is a continuation of U.S. patent application Ser. No. 17/583,751, filed Jan. 25, 2022, which is a continuation of U.S. patent application Ser. No. 16/562,309, filed Sep. 5, 2019, now U.S. Pat. No. 11,232,082, which is a continuation of U.S. patent application Ser. No. 15/720, 766, filed Sep. 29, 2017, now U.S. Pat. No. 10,452,626, which is a continuation of U.S. patent application Ser. No. 15/474,713, filed Mar. 30, 2017, now U.S. Pat. No. 9,805, 071, which claims the benefit under 35 U.S.C. § 119(e) of U.S. Provisional Application No. 62/420,353 filed Nov. 10, 2016. The contents of each of the above-identified applications are incorporated by reference in their entirety into the present disclosure.

FIELD OF THE INVENTION

This disclosure relates to approaches for migrating live data.

BACKGROUND

Data migration refers to the process of transferring data between storage types, formats, or computer systems. It is a key consideration for any system implementation, upgrade, or consolidation. In a typical example, data is stored in tables of a database. Over time, for various reasons, such as changes to the database schema, it may be necessary to migrate the data from one or more tables of a first database to one or more tables of a second database. For example, the migration may also include converting data from one schema to another schema. For large-scale applications, the migration may take several hours to days. Due to commercial, practical, or other reasons, it may be unrealistic to bring the database system offline during the migration.

SUMMARY

Various embodiments of the present disclosure can include systems, methods, and non-transitory computer readable media configured to cause at least one first table of a first database schema to be migrated to at least one second table of a second database schema; determine a query for modifying the first table during the migration; modify the second table based at least in part on the query; and update a mutation table to describe the modification, wherein the mutation table at least describes the modification.

In some embodiments, the systems, methods, and non-transitory computer readable media are configured to determine a second query for accessing the at least one field during the migration; determine that the at least one field has been modified based at least in part on the mutation table; and provide data corresponding to the field from the second table in response to the second query.

In some embodiments, the systems, methods, and non-transitory computer readable media are configured to determine a second query for accessing the at least one field during the migration; determine that the at least one field has not been modified based at least in part on the mutation table; and provide data corresponding to the field from the first table in response to the second query.

In some embodiments, the systems, methods, and non-transitory computer readable media are configured to determine at least one field to be migrated from the first table to the second table; determine that no write operations have been performed to a row corresponding to the field during the migration; and cause the field to be migrated from the first table to the second table.

In some embodiments, the systems, methods, and non-transitory computer readable media are configured to determine that no write operations were performed on the row based at least in part on the mutation table.

In some embodiments, the systems, methods, and non-transitory computer readable media are configured to cause data corresponding to the field in the first table to be populated in one or more fields of the second table based at least in part on a respective schema of the second table.

In some embodiments, modifying the first table includes at least one of modifying data, inserting data, or deleting data in the first table.

In some embodiments, the systems, methods, and non-transitory computer readable media are configured to determine a row in the second table to which the modification was performed; and update the mutation table to indicate that the row has been modified.

In some embodiments, the mutation table is updated to indicate the row was modified by updating a Boolean value that corresponds to the row.

In some embodiments, the systems, methods, and non-transitory computer readable media are configured to determine a second query for accessing the at least one row during the migration; determine that the at least one row has been modified based at least in part on the mutation table; determine that the row has been deleted from the second table; and provide a null value in response to the second query.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A-B illustrate example database tables, according to embodiments of the present disclosure.

Figure 1:
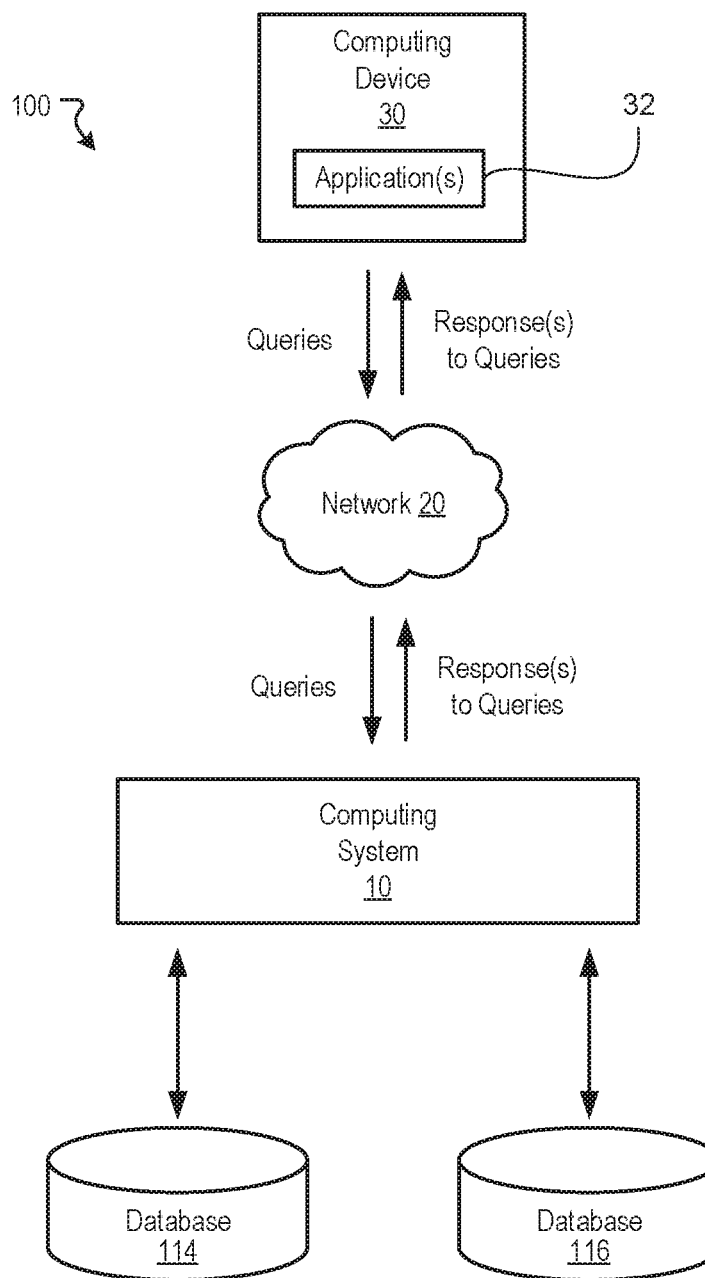
FIG. 1 illustrates a block diagram of an example of a system for performing live data migrations, according to embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Under conventional approaches, processing queries while migrating a live database from one schema to another can pose several challenges. In one example, users may submit queries that add, modify, or delete data stored in the database tables being migrated. In this example, computing systems tasked with processing such queries must be able to accurately track changes to the data so that the most up-to-date version of the data can be provided in response to any queries accessing the modified data.

A claimed solution rooted in computer technology overcomes problems specifically arising in the realm of computer technology. In various implementations, a computing system is configured to process read and write queries to a database while migrating tables in the database from an old schema to a new schema. For example, in some implementations, the system can maintain a mutation table that tracks any changes made to fields (e.g., rows, columns, or both) in the database tables during the migration. When a query for modifying a field in a database table is received, the system can modify the appropriate field in the database table that corresponds to the new schema. The system can also update the mutation table to indicate the modification. When a query for accessing the field is received, the system can determine whether the field was modified based on the mutation table. If the field was modified, the system returns data stored in the field from the database table corresponding to the new schema.

FIG. 1 illustrates a block diagram of an example of a system 100 for performing live data migrations, according to embodiments of the present disclosure. The example system shown in FIG. 1 includes a computing system 10 and a computing device 30 that can communicate with one another over a network 20. The computing system 10 may be configured to implement one or more of the various embodiments described herein. Depending on the implementation, the computing device 30 may be any computing device having one or more processors, e.g., a mobile device. The network 20 may include one or more computer networks (e.g., the Internet, local area networks, etc.) or other transmission mediums. Such networks may be wired and/or wireless. The system 100 may include more, fewer, or alternative components than those shown in FIG. 1.

In various embodiments, the computing device 10 can be configured to process queries that are received from various computing devices, e.g., the computing device 30. Such queries may involve requesting data that is stored in one or more tables of a database, writing new data in the one or more tables of the database, modifying existing data in the one or more tables of the database, and/or deleting existing data in the one or more tables of the database. The computing device 10 can process such queries and provide data that is responsive to the queries. In some instances, the computing device 30 may be running one or more software applications 32 that have been configured to query data that is stored in a particular database, e.g., the database 114.

In various embodiments, a live migration of data from one database, e.g., the database 114, to another database, e.g., the database 116, may involve transferring (or copying) data from one or more tables of the database 114 to one or more tables of the database 116. In some instances, one or more tables of the database 114 may be configured for a first schema while the corresponding tables in the database 116 may be configured for a second schema. In one example, FIG. 2A illustrates an example table 22 in the database 114. The example table 22 includes a set of columns "First Name", "Last Name", "Street", "City", and "State". FIG. 2B illustrates an example table 24 in the database 116. The example table 24 includes a fewer set of columns than the table 22 and includes columns labeled "First Name", "Last Name", and "Address". The tables 22 and 24 are provided merely as examples and, naturally, any form of data can be migrated from one database to another regardless of being migrated between the same schema or different schemas.

The term "database" may refer to any data structure for storing and/or organizing data, including, but not limited to, relational databases (Oracle database, MySQL database, etc.), spreadsheets, XML files, and text file, among others. In some embodiments, a database schema of a database system is its structure described in a formal language supported by the database management system. The term "schema" refers to the organization of data as a blueprint of how the data is constructed (divided into database tables in the case of relational database).

In general, when performing a live migration, the data that was available in the database from which data is being migrated, e.g., the database 114, including any changes made to the data during the migration, should be remain accessible while the migration is process. Such reliability is typically needed so that existing applications 32 (or resources) that rely on the data can continue to operate until the applications 32 have been modified or upgraded to utilize the database (e.g., database schema) to which the data is being migrated, e.g. the database 116. In various embodiments, the computing system 10 (or another computing system) is configured to migrate live data, for example, from one or more first databases, e.g., the database 114, to one or more second databases, e.g., the database 116, without interrupting the operations of existing applications 32 (or resources) that rely on the data being migrated. In general, such migration may involve transferring (e.g., copying, moving, etc.) data stored in one or more tables in the database 114 to one or more corresponding tables in the database 116. Various approaches discussed below allow for performing a live migration of data in such computing environments. Such approaches can be used to perform the live migration of data while ensuring that existing applications, or resources, that rely on the data can continue to operate without interruption. Depending on the implementation, the approaches may be used either alone or in combination.

Figure 3:
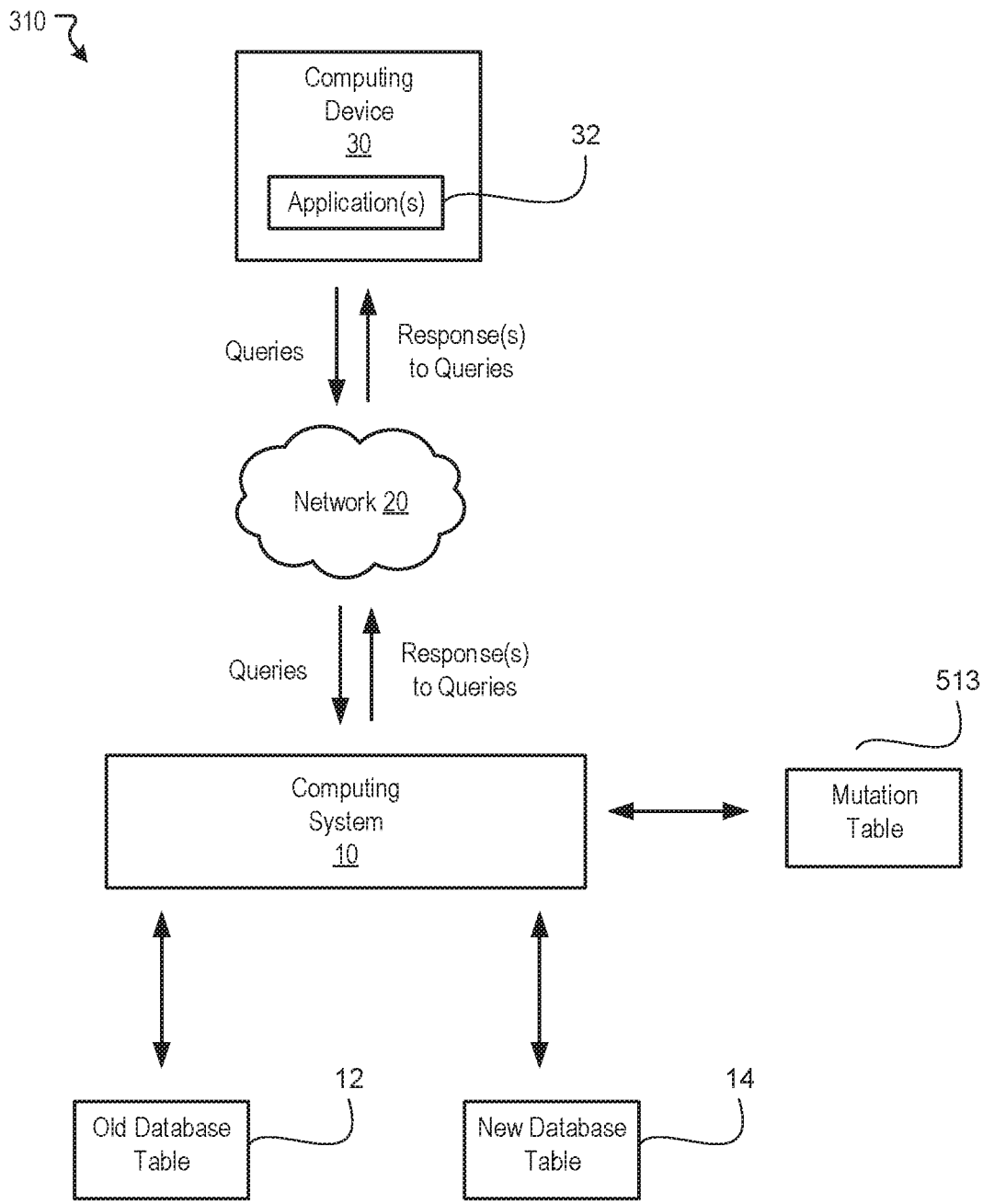
FIG. 3 illustrates a block diagram of an example approach for performing live data migrations, according to embodiments of the present disclosure.

FIG. 3 illustrates a block diagram of an example environment 310 for performing live data migrations, according to embodiments of the present disclosure. FIG. 3 shows the computing system 10 and the computing device 30 as described in FIG. 1. As mentioned, the computing system 10 and the computing device 30 can interact with one another over the network 20. FIG. 3 also illustrates an example old table 12 in a first database, e.g., the database 114 of FIG. 1, and an example new table 14 in a second database, e.g., the database 116 of FIG. 1. In this example, data from the old table 12 is being migrated to the new table 14.

FIG. 3 provides one example approach for migrating data from old table 12 to new table 14 in a live production environment 310. As mentioned, the approaches described herein can be adapted to migrate data from the old table 12 to the new table 14 regardless of whether the tables 12 and 14 have the same schema or different schemas. In this example, one or more applications 32 (or resources) running on the computing device 30 may submit queries to the computing system 10. These application(s) 32 may be configured to query data from various database table(s) having a first schema, e.g., the database 114 of FIG. 1. As mentioned, such queries may involve operations to access data from tables and/or operations that write data to tables.

In various embodiments, to ensure that operation of the application(s) is not interrupted during the live migration, the computing system 10 is tasked with processing the submitted queries using the most recent, or up-to-date, data. To do so, in some embodiments, the computing system 10 utilizes a separate mutation table 513 to keep track of data to which write operations have been performed during the migration. For example, in some embodiments, the mutation table is configured to track whether a particular row has been modified during the migration. In one example, the mutation table 513 may store a row identifier (e.g., name, number, value, etc.) and a corresponding Boolean value indicating whether a write operation has been performed on the row during the migration.

When performing the migration, in some embodiments, the computing system 10 copies over each field in the old table 12 to the new table 14. A field may be referenced by a row identifier and a column identifier, for example. In such embodiments, when copying fields, the computing system 10 can determine whether the row corresponding to the field was previously modified by any write operations that were performed during the migration. For example, the computing system 10 can reference the mutation table 513 to determine whether the corresponding Boolean value for the row is true. In this example, a true value in the mutation table 513 indicates that the row was modified. If the field was previously modified, then the field is not copied to the new table 14 so that any up-to-date values already stored in the new table 14 are not overwritten. Otherwise, if the field was not previously modified, the computing system 10 copies the field from the old table 12 to the new table 14. As mentioned, the old table 12 and new table 14 may have different schemas (e.g., different columns, etc.). Thus, in various embodiments, the computing system 10 can determine the appropriate location in which the field being copied is to be stored, for example, based on a pre-defined mapping of columns between the different schemas. The computing system 10 can further be configured to parse the data being migrated from one table, e.g., the table 12, to another table, e.g., the table 14 based on the different table schemas so that the parsed portions of the data are migrated, or populated, to the appropriate locations (e.g., fields, rows, columns, etc.) based on the respective schema of the table to which the data is being migrated.

In some embodiments, when a query for performing a write operation (e.g., modifying existing rows, deleting rows, etc.) to the old table 12 is received, the computing system 10 is configured to perform the write operation on the new table 14. In one example, a query that modifies row n (e.g., n being some numerical value) in the old table 12 can be executed against the new table 14 so that row n in new table 14 is modified instead of old table 12. In such embodiments, the computing system 10 can also update the mutation table 513 to indicate that row n was modified during the migration, e.g., by setting the corresponding Boolean value for row n in the mutation table 513 to "true". In such embodiments, performing the write operations on the new table 14 allows the computing system 10 to store the most recent or up-to-date data in the new table 14 to which data is being migrated which prevents loss of data during the live migration. In some instances, the write operation may delete one or more rows from a table. In such instances, the row can be deleted in the new table 14 to which the data is being migrated. Similarly, the mutation table 513 can be updated to reflect the modification (e.g., deletion) as described above. When a query for accessing the deleted row is received, the computing system 10 can determine that the row has been modified using the mutation table 513, for example. The computing system 10 can further determine that the row is no longer present in the new table 14. In this example, the computing system 10 can provide a response (e.g., null value) indicating that the row is no longer available for access.

In some embodiments, when a query for performing a read operation is received (e.g., reading a row of data), the computing system 10 can determine if the row being read was previously modified, for example, using the mutation table 513. For example, the computing system 10 can reference the mutation table 513 to determine whether the corresponding Boolean value for the row is true. In this example, a true value in the mutation table 513 indicates that the row was modified. If the row was previously modified, then the computing system 10 provides data corresponding to the row from the new table 14 to which data is being migrated. Otherwise, if the row has not been modified, then the computing system 10 provides data corresponding to the row from the old table 12 from which data is being migrated. Such coordination of read operations allows the computing system 10 to process queries using the most recent or up-to-date data that is available in the live production environment.

Figure 4:
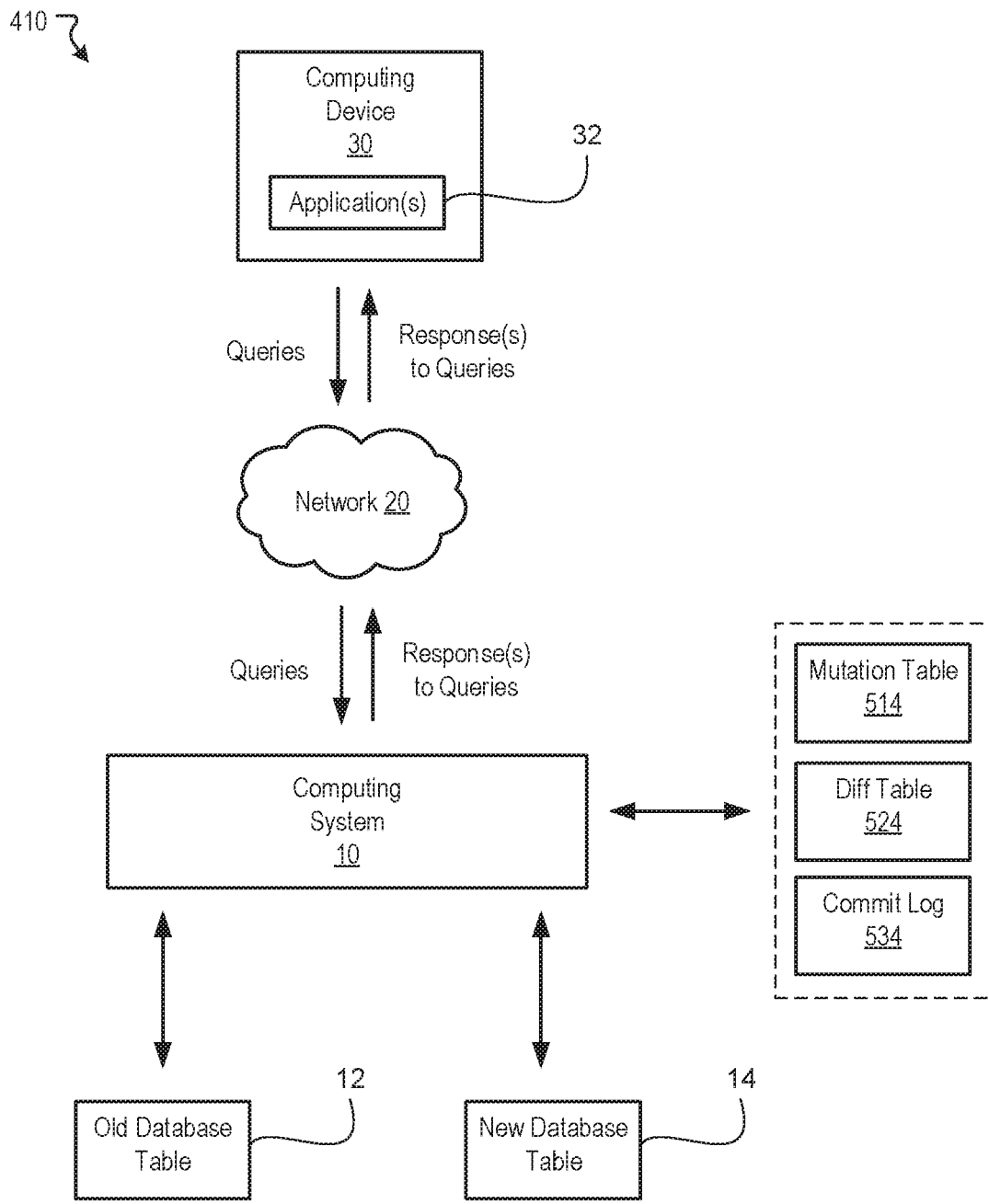
FIG. 4 illustrates a block diagram of another example approach for performing live data migrations, according to embodiments of the present disclosure.

FIG. 4 illustrates a block diagram of an example environment 410 for performing live data migrations, according to embodiments of the present disclosure. FIG. 4 shows the computing system 10 and the computing device 30 as described in FIG. 1. As mentioned, the computing system 10 and the computing device 30 can interact with one another over the network 20. FIG. 4 also illustrates an example old table 12 in a first database, e.g., the database 114 of FIG. 1, and an example new table 14 in a second database, e.g., the database 116 of FIG. 1. In this example, data from the old table 12 is being migrated to the new table 14.

FIG. 4 provides another example approach for migrating data from old table 12 to new table 14 in a live production environment 310. As mentioned, the approaches described herein can be adapted to migrate data from the old table 12 to the new table 14 regardless of whether the tables 12 and 14 have the same schema or different schemas. As mentioned, in various embodiments, to ensure that operation of various application(s) is not interrupted during the live migration, the computing system 10 is tasked with processing submitted queries using the most recent, or up-to-date, data. To do so, in some embodiments, the computing system 10 utilizes a separate mutation table 514 to keep track of data to which write operations have been performed during the migration, as described above. In such embodiments, since the old table 12 becomes immutable once the live migration starts, an end of the migration can be determined when all old rows of the old table 12 have been migrated. During the migration of the old table 12, one or more updates to the old table 12 may be recorded and logged chronologically such that the updates can be applied after the migration according to the chronological order. In some implementations, the computing system 10 may utilize a separate diff table 524 to store data provided with write operations that were submitted from various client devices, e.g., the computing device 30. In some embodiments, the diff table 524 has the same schema as the new table 14 to which data is being migrated. The computing device 10 can also utilize a commit log 534 that logs data describing the various rows to which write operations have been performed during the migration. In some embodiments, the commit log 534 keeps a log of all rows to which write operations were performed in chronological order. In one example, the commit log 534 stores information identifying a row to which a write operation was performed (e.g., row identifier, name, number, value, etc.) along with a corresponding timestamp indicating when the write operation was performed.

In some embodiments, when a query for performing a write operation (e.g., modifying existing rows, deleting rows, etc.) to the old table 12 is received, the computing system 10 is configured to perform the write operation on the diff table 524. In one example, a query that modifies row n (e.g., n being some numerical value) in the old table 12 can be executed against the diff table 524 so that row n in the diff table 524 is modified instead of old table 12. In such embodiments, the computing system 10 can also update the mutation table 514 to indicate that row n was modified during the migration, e.g., by setting the corresponding Boolean value for row n in the mutation table 514 to "true". Further, in such embodiments, the computing system 10 can also update the commit log 534 to include information identifying the row to which the write operation was performed along with a corresponding timestamp indicating when the write operation was performed.

When performing the migration, in some embodiments, the computing system 10 migrates each field in the old table 12 to the new table 14. A field may be referenced by a row identifier and a column identifier, for example. For example, the computing system 10 can copy each field in the old table 12 to a corresponding field in the new table 14. The computing system 10 can then utilize the commit log 534 to migrate rows to which write operations were performed. For example, for each row in the commit log 534, the computing system 10 can chronologically apply the events in the commit log 534 onto the new table 14.

In some embodiments, when a query for performing a read operation is received (e.g., reading a row of data), the computing system 10 can determine if the row being read was previously modified, for example, using the mutation table 514. If the row was previously modified, then the computing system 10 provides data corresponding to the row from the diff table 524. Otherwise, if the row has not been modified, then the computing system 10 provides data corresponding to the row from the old table 12 from which data is being migrated.

Figure 5:
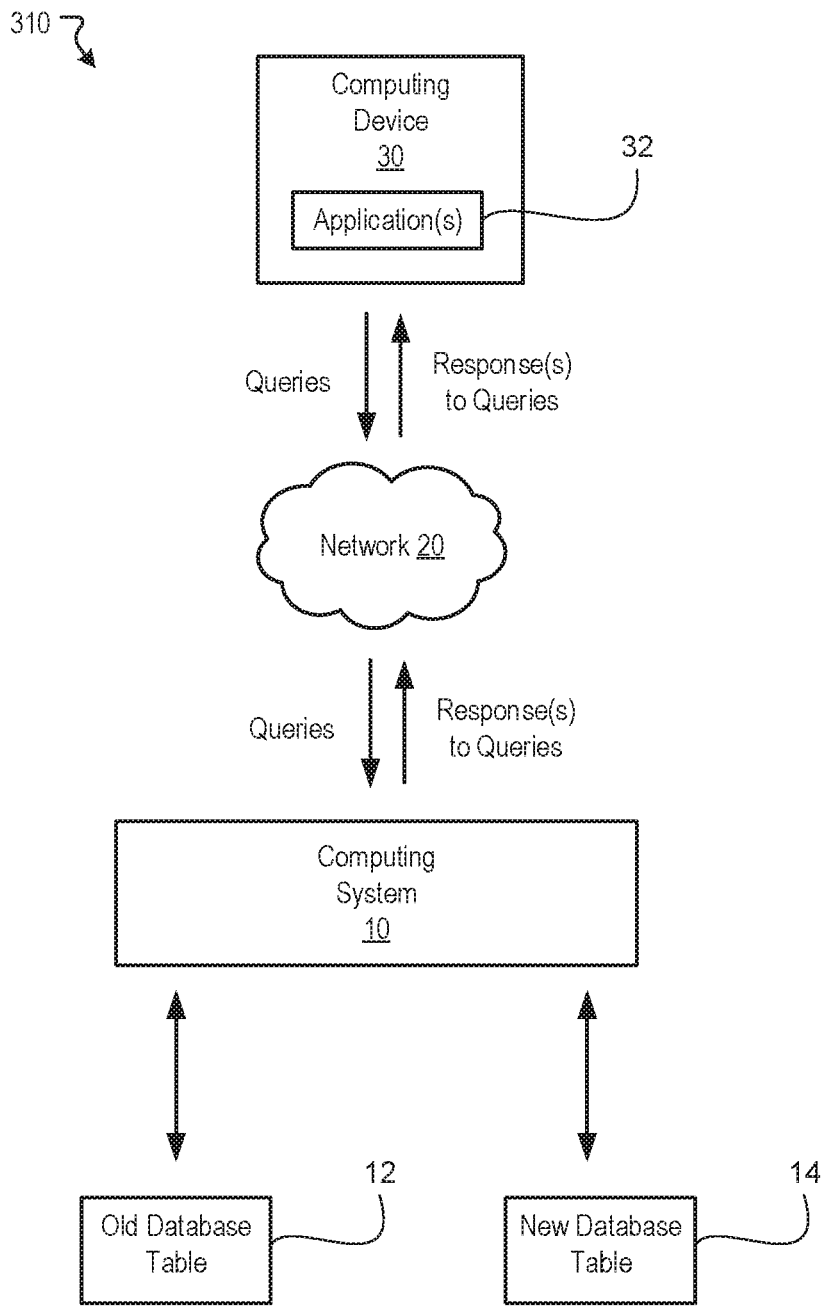
FIG. 5 illustrates a block diagram of another example approach for performing live data migrations, according to embodiments of the present disclosure.

FIG. 5 illustrates a block diagram of an example environment 510 for performing live data migrations, according to embodiments of the present disclosure. FIG. 5 shows the computing system 10 and the computing device 30 as described in FIG. 1. As mentioned, the computing system 10 and the computing device 30 can interact with one another over the network 20. FIG. 5 also illustrates an example old table 12 in a first database, e.g., the database 114 of FIG. 1, and an example new table 14 in a second database, e.g., the database 116 of FIG. 1. In this example, data from the old table 12 is being migrated to the new table 14.

FIG. 5 provides another example approach for migrating data from old table 12 to new table 14 in a live production environment 310. As mentioned, the approaches described herein can be adapted to migrate data from the old table 12 to the new table 14 regardless of whether the tables 12 and 14 have the same schema or different schemas. As mentioned, in various embodiments, to ensure that operation of various application(s) is not interrupted during the live migration, the computing system 10 is tasked with processing submitted queries using the most recent, or up-to-date, data.

In some embodiments, when a query for performing a write operation (e.g., modifying existing rows, deleting rows, etc.) to the old table 12 is received, the computing system 10 is configured to perform the write operation on the new table 14. In one example, a query that modifies row n (e.g., n being some numerical value) in the old table 12 can be executed against the new table 14 so that row n in the new table 14 is modified. Further, in such embodiments, the computing system 10 can also update the old table 12 based on the write operation. In some instances, the schemas of old table 12 and new table 14 may differ. In such instances, data included in any new columns in the new table 14 may be omitted from the old table 12.

In the example of FIG. 5, the computing system 10 can perform the migration without relying on any tables (or logs). For example, when migrating a field from the old table 12 to the new table 14, in some embodiments, the computing system 10 determines whether the row corresponding to the field already exists in the new table 14. If the row does not exist in the new table 14, the computing system 10 migrates the field to the new table 14.

In some embodiments, when a query for performing a read operation is received (e.g., reading a row of data), the computing system 10 provides the requested data (e.g., row) from the old table 12.

Figure 6:
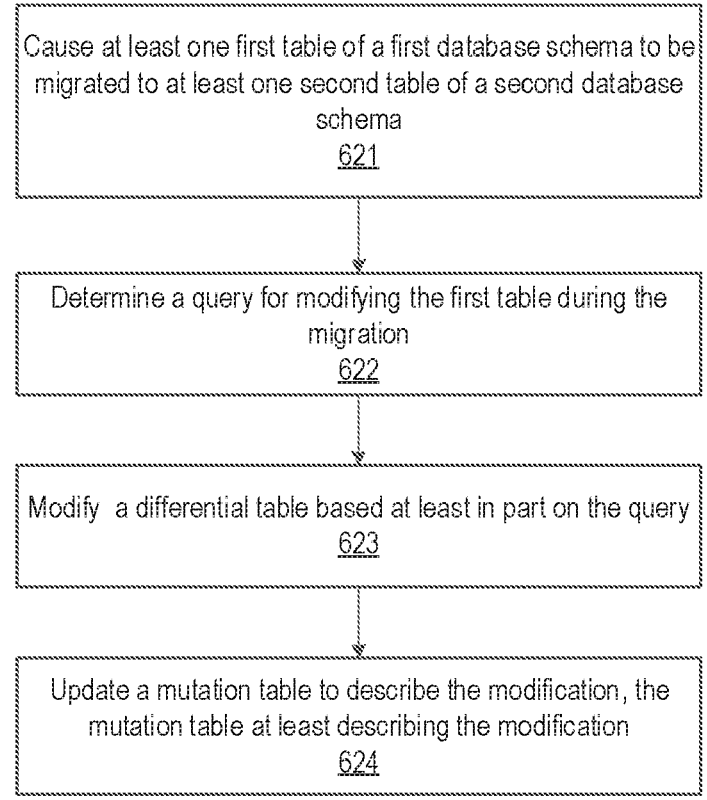
FIG. 6 illustrates a flowchart of an example method for performing a live data migration, according to embodiments of the present disclosure.

FIG. 6 illustrates a flowchart of an example method 610 for live data migration, according to various embodiments of the present disclosure. The method 610 may be implemented in various environments including, for example, the environment 310 of FIG. 3. The operations of method 610 presented below are intended to be illustrative. Depending on the implementation, the example method 610 may include additional, fewer, or alternative steps performed in various orders or in parallel. The example method 600 may be implemented in various computing systems or devices including one or more processors.

At block 621, at least one first table of a first database schema is migrated to at least one second table of a second database schema. At block 622, a determination is made of a query for modifying the first table during the migration. At block 623, the second table is modified based at least in part on the query. At block 624, the mutation table is updated to describe the modification, wherein the mutation table at least describes the modification.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
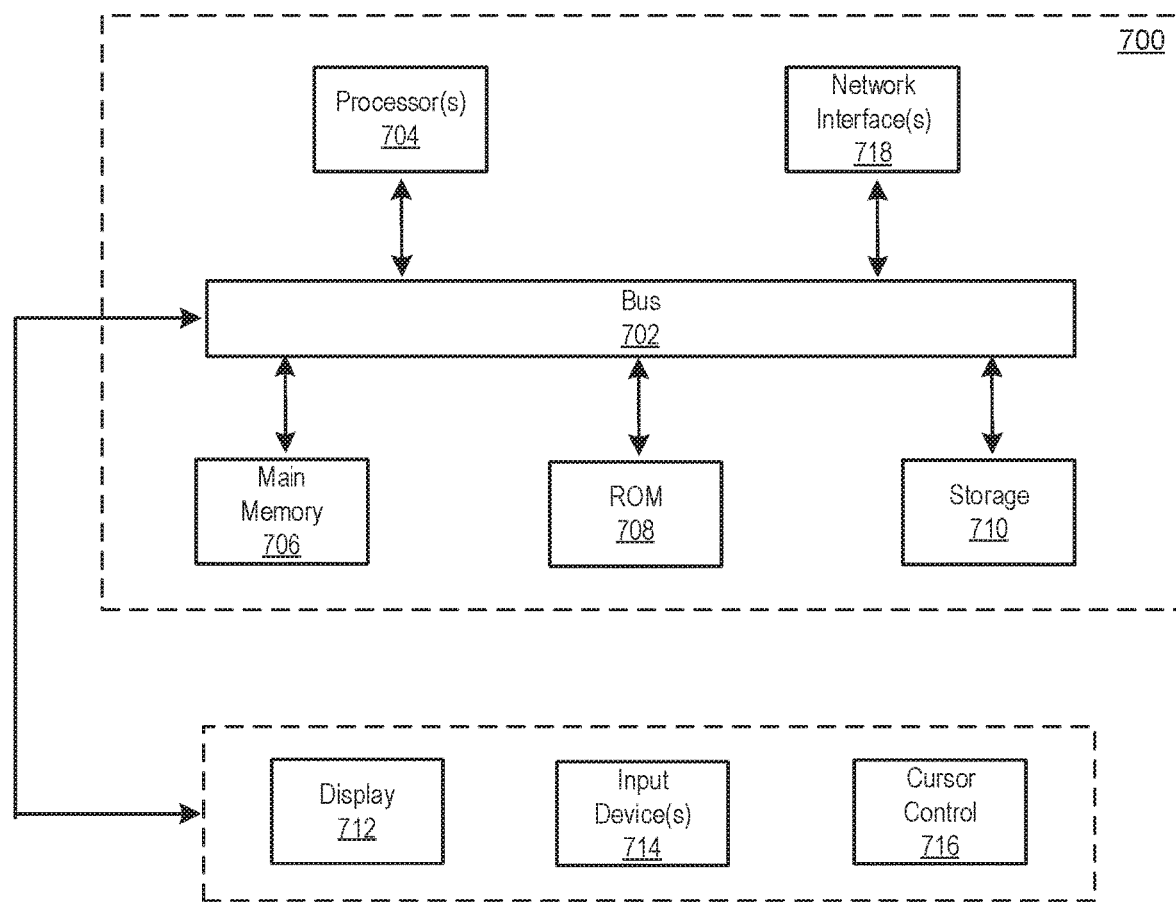
FIG. 7 is a block diagram that illustrates a computer system upon which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system for live data migration, the computing system comprising:
one or more processors; and
memory storing instructions that, when executed by the one or more processors, cause the computing system to perform:
migrating a first table of a first database schema to a second table of a second database schema, the at least one first table storing live data, the second table incorporating data from the first table;
determining, based on a tracking table that monitors modifications, whether any modification has occurred in the first table during the migrating of the first table; and
in response to a modification occurring in the first table, modifying a corresponding second field in the second table based on the tracking table, wherein the modifying of the second field comprises applying the modification to the second field after the migration, the applying of the modification comprising parsing modified data corresponding to the any modification in the first table and inserting or populating the parsed modified data into the second field.

2. The system of claim 1, wherein the instructions further cause the system to perform:
updating the tracking table in response to the modifying of the second field.

3. The system of claim 1, wherein the instructions further cause the system to perform:
in response to receiving a query for accessing the first field, and in response to the migrating of the first table and the first field being modified during the migration, returning the second field.

4. The system of claim 1, wherein the first database schema or the second database schema comprises rows and columns.

5. The system of claim 1, wherein the first table is immutable.

6. The system of claim 1, wherein the instructions further cause the system to log any rows to which write operations have been performed during the migrating of the first table.

7. The system of claim 1, wherein the instructions further cause the system to perform:
in response to receiving a query for accessing the first field, and in response to the migrating of the first table and the first field being unmodified during the migration, returning the first field.

8. The computing system of claim 1, wherein the instructions further cause the computing system to feed the modified second field to a computing application so that the computing application operates in an uninterrupted manner.

9. The computing system of claim 1, wherein the instructions further cause the computing system to log, in a separate table, write operations submitted from different client devices.

10. A computer-implemented method, the method being implemented by a computing system including one or more processors and storage media storing machine-readable instructions, the method comprising:
migrating a first table of a first database schema to a second table of a second database schema, the at least one first table storing live data, the second table incorporating data from the first table;
determining, based on a tracking table that monitors modifications, whether any modification has occurred in the first table during the migrating of the first table; and
in response to a modification occurring in the first table, modifying a corresponding second field in the second table based on the tracking table, wherein the modifying of the second field comprises applying the modification to the second field after the migration, the applying of the modification comprising parsing modified data corresponding to the any modification in the first table and inserting or populating the parsed modified data into the second field.

11. The method of claim 10, further comprising:
updating the tracking table in response to the modifying of the second field.

12. The method of claim 10, further comprising:
in response to receiving a query for accessing the first field, and in response to the migrating of the first table and the first field being modified during the migration, returning the second field.

13. The method of claim 10, wherein the first database schema or the second database schema comprises rows and columns.

14. The method of claim 10, wherein the first table is immutable.

15. The method of claim 10, further comprising logging any rows to which write operations have been performed during the migrating of the first table.

16. The method of claim 10, further comprising:
in response to receiving a query for accessing the first field, and in response to the migrating of the first table and the first field being unmodified during the migration, returning the first field.

17. A non-transitory computer readable storage media of a computing system storing instructions that, when executed by one or more processors of the computing system, cause the computing system to perform:
migrating a first table of a first database schema to a second table of a second database schema, the at least one first table storing live data, the second table incorporating data from the first table;
determining, based on a tracking table that monitors modifications, whether any modification has occurred in the first table during the migrating of the first table; and
in response to a modification occurring in the first table, modifying a corresponding second field in the second table based on the tracking table, wherein the modifying of the second field comprises applying the modification to the second field after the migration, the applying of the modification comprising parsing modified data corresponding to the any modification in the first table and inserting or populating the parsed modified data into the second field.

18. The non-transitory computer readable storage media of claim 17, wherein the instructions, when executed by one or more processor of the computing system, cause the computing system to perform:
   updating the tracking table in response to the modifying of the second field.

19. The non-transitory computer readable storage media of claim 17, wherein the instructions, when executed by one or more processor of the computing system, cause the computing system to perform:
   in response to receiving a query for accessing the first field, and in response to the migrating of the first table and the first field being modified during the migration, returning the second field.

20. The non-transitory computer readable storage media of claim 17, wherein the first database schema or the second database schema comprises rows and columns.

* * * * *